Nov. 19, 1940.  E. A. ROBERTSON  2,222,574
ELECTRICAL CABLE FOR WELDING MACHINES
Filed Aug. 5, 1938
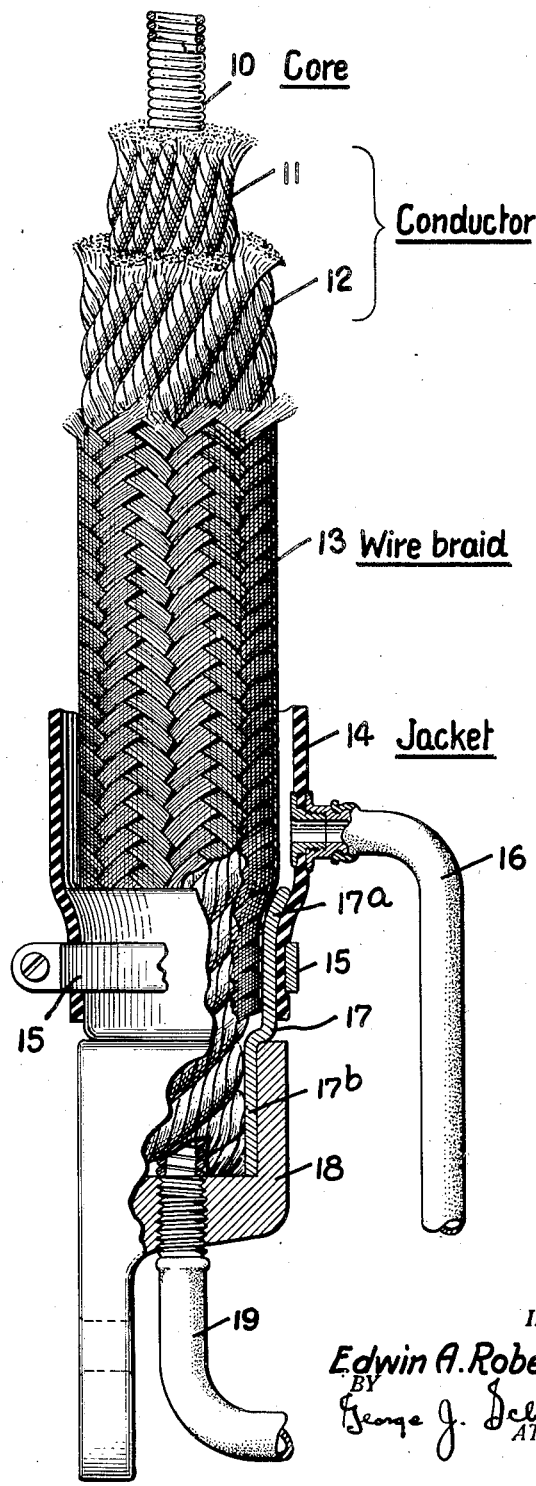
INVENTOR.
Edwin A. Robertson
BY George J. Schottler
ATTORNEY.

Patented Nov. 19, 1940

2,222,574

UNITED STATES PATENT OFFICE 2,222,574

ELECTRICAL CABLE FOR WELDING MACHINES

Edwin A. Robertson, Sandusky, Ohio, assignor to General Cable Corporation, New York, N. Y., a corporation of New Jersey Application August 5, 1938, Serial No. 223,155

16 Claims. (Cl. 174—15)

This invention relates to electrical cables, particularly to flexible fluid-cooled welding cables, and has for an object the provision of improvements in this art.

Welding cables are required to carry heavy electrical currents, often as high as 10,000 to 20,000 amperes, and become heated to such an extent that it is customary to cool them by circulating a fluid such as water or other suitable medium through them. The cables should also be very flexible to permit easy manipulation of the welding tool. Consequently the cables are made of a loose construction which permits the desired flexibility and also permits the cooling fluid to circulate throughout the entire body of the cable. It is usual to enclose the cables in reinforced rubber hose to confine the cooling fluid, and a flexible tubular core may be placed interiorly of the cable to insure a free flow for a large volume of cooling fluid.

To provide flexibility the cable is usually formed of loosely twisted ropes each composed of a plurality of strands of conducting material such as tinned copper. Due to pronounced magnetic reaction between the twisted ropes when the heavy current is applied, and also due to vibration, the cable tends to expand. It has been customary to wrap the cables with heavy fabric braid to restrain the swelling, because if the cables expand excessively the conducting strands tend to break under the constant and severe flexing to which the cables are subjected. If strands break, dangerous local current disturbances are produced, and the loose strands tend to obstruct the fluid passages and injure the enclosing hose. But the fabric braid soon deteriorates on account of contact with the cooling fluid, particularly when water is used.

According to the present invention these difficulties are overcome by enclosing the cable in a loose flexible braid of non-magnetic, non-corrosive metallic strands, preferably of high tensile strength. This metallic braid confines the cable against undue expansion, permits all desired flexing, and will not deteriorate from contact with the cooling fluid. The metal braid also resists constricting pressures to a marked extent, making it feasible to mold a rubber jacket thereon without binding the cable so much as to impair its flexibility.

A second cause of cable failure has been due to breakage of strands near the terminals at each end due to severe bending and vibration. By the use of the metallic outer braid it is possible to employ an improved type of terminal connection which will minimize breakage. Moreover, the metallic braid has sufficient strength and may be so anchored to the terminals as to enable it to take a large part of the strains which otherwise would be imposed upon the weaker conducting strands of the cable. In particular the metal braid prevents sharp local bending of the conductor which has tended so strongly to breakage of strands. Moreover, the metal braid itself will serve to carry considerable current.

The objects, features, and advantages of the invention will be apparent to those skilled in the art from the following description of an illustrative embodiment of the invention when considered in connection with the accompanying drawing, wherein:

The single figure is a side elevation of a cable with the layers cut back progressively at one end to reveal the underlying structure, and the other end shown partly in section.

Referring to the drawing, the cable comprises a flexible hollow core 10, preferably formed as a winding of rustless springy metal, such as bronze or brass. The core directs a stream of cooling fluid, but also is open laterally to permit the cooling fluid to flow out into and in from the spaces within the cable body.

Around the core 10 there is loosely wound a plurality of loosely twisted ropes 11 of conducting material. Each rope may be formed of a plurality of bunches of small tinned copper wires, for example #30 wires.

Around the first layer of ropes there is loosely wound a second similar layer composed of a plurality of loosely wound ropes 12 of conducting material. Each rope may be formed of a plurality of bunches of small tinned copper wires, for example #30 wires. The ropes 12 may be larger or more numerous than the ropes 11, or both larger and more numerous.

Over the outer layer of ropes there is placed a braid 13 comprising a plurality of flat ribbons, each composed of a plurality of small parallel strands of non-magnetic, high tensile, non-corrosive, flexible metal. Stainless steel known as "18-8" composition may for example be used for this purpose. The individual strands or wires may be .013" diameter. The material specified has a tensile strength of approximately 100,000 lbs./sq. in. The weave is fairly close, but the braid is not drawn tightly over the underlying rope layer. Such a braid will not permit the cable to be bent at a sharp angle such as would cause the conducting strands of the ropes to be readily broken by constant flexing; yet permits all desired overall flexing in the length of cable which is used. The braid also provides greatly increased longitudinal tensile strength to the cable, largely relieving the conducting strands of weaker material of the tensile strains which would otherwise be imposed upon them. The braid also resists undue swelling of the cable in use. Moreover, the braided tube has sufficient rigidity to resist compressive forces circumferentially applied over a considerable length of the cable, as when a rubber jacket is tightly placed thereon.

While stainless steel is preferred for the armor braid, other metals may be used with reasonable success. As one example phosphor bronze may be mentioned.

To protect the workers from the bare current-conducting metal and to enclose the cooling fluid, the cable may be encased in a rubber jacket 14. This may be placed tightly on the braid, as above suggested, or may comprise a loose fitting rubber hose drawn on the cable after it has been cut to proper length. The hose is bound tightly to the cable at each end by clamps 15. A cooling fluid supply (or exhaust) tube 16 may also be connected near each end through a wall of the hose.

A cable of the character described is well suited to cooperate with the novel type of terminal illustrated herein. After the cable has been cut to length, the core, copper wires, and steel braid are tinned for a certain distance, for example 1", from the end. The ends are then swedged to reduce the diameter considerably, a rigid member being placed in the core tube to prevent its collapse during this operation.

A copper ferrule 17 which has been flared at one end, as at 17a, and tinned interiorly is slipped on the reduced end of the cable. For a distance from the other end, as at 17b, the ferrule is swedged tightly down upon the already swedged end of the cable. The end is then heated to allow the tin or solder to fill all the interstices in the swedged end.

The hose 14 may then be applied and secured. Finally a terminal 18 is soldered on the reduced end 17b of the ferrule 17. The terminal is provided with a threaded hole for attachment of a hose 19 for supplying (or exhausting) cooling fluid directly into the tubular core 10. Either hose 16 or 19 may suffice, since fluid may pass through all parts of the cable. If only the tube 10 is used for the main flow of water, the hose 19 may serve as an inlet and a similar hose 19 at the other end of the cable may serve as an outlet. In this case the water filling the spaces between the strands will serve to conduct heat to the main flow of water even if the water does not circulate freely between the strands. If an outlet like 16 is used at the other end, then the water will also flow over the outside of the cable within the hose 14 and will flow through the cable from inside to outside or vice versa. If the tube 10 is omitted the water may be forced more strongly to flow through the cable spaces, the space between the cable and hose 14 serving to some extent for rapid flow. In the latter case either inlets and outlets like 19 or 16 or both may be used at each end of the cable.

The described terminal connection prevents sharp localized bending near the ends of the cable where breakage usually occurs, furnishes a good tension connection with the strong metal braid, and establishes a good electrical connection with all parts at the ends of the cable.

While one embodiment of the invention has been described in order to illustrate the principles of the invention, it is to be understood that the invention may be variously embodied within the limits of the prior art and the scope of the subjoined claims.

I claim:

1. An electrical cable adapted for use with welding machines employing heavy currents, comprising in combination, a flexible, non-corrosive tubular core having fluid passages through its side walls, a plurality of loose, flexible ropes of conducting strands loosely twisted about said core, and a braid of non-magnetic, non-corrosive, flexible metal strands of high tensile strength over said twisted ropes.

2. An electrical cable adapted for use with welding machines employing heavy currents, comprising in combination, a cable body including loosely twisted ropes of small flexible non-corrosive conducting strands providing for circulation of cooling fluid throughout said cable body, and a braid formed of a plurality of ribbons of small strands of stainless steel over said body.

3. A flexible, fluid-cooled electrical cable, comprising in combination, a flexible tubular non-tight fluid conducting core formed of spirally wound bronze spring wire, a layer composed of a plurality of loosely wound ropes each composed of a plurality of loosely twisted bunches of small tinned copper strands, a second layer composed of a plurality of of loosely wound ropes each composed of a plurality of loosely twisted bunches of small tinned copper strands, and a braid composed of a plurality of ribbons each composed of a plurality of small stainless steel strands over the whole.

4. A flexible, fluid-cooled electrical cable adapted for use with portable welding machines, comprising in combination, a flexible cable body composed of loosely twisted metallic conducting strands providing for the circulation of a cooling fluid therethrough, a braid formed of small flexible strands of non-magnetic, non-corrosive, metal of high tensile strength over said body, an insulating fluid-confining jacket over said braid, and means for supplying and removing cooling fluid from said cable.

5. A flexible, fluid-cooled electrical cable adapted for use with portable welding machines, comprising in combination, a flexible cable body composed of loosely twisted metallic conducting strands providing for the circulation of a cooling fluid therethrough, a braid formed of small flexible strands of non-magnetic, non-corrosive metal of high tensile strength over said body, a copper ferrule placed over said braid and body at the end of the cable, said ferrule being swedged down compressively on the cable body at its outer end and being flared at its inner end, whereby to secure good electrical connections and prevent sharp localized bending.

6. A flexible, fluid-cooled electrical cable adapted for use with portable welding machines, comprising in combination, a flexible cable body composed of loosely twisted metallic conducting strands providing for the circulation of a cooling fluid therethrough, a braid formed of small flexible strands of non-magnetic, non-corrosive metal of high tensile strength over said body, a copper ferrule placed over said braid and body at the end of the cable, said ferrule being swedged down compressively on the cable body at its outer end and being flared at its inner end, and an electrical terminal placed over the swedged portion of said ferrule.

7. A flexible, fluid-cooled electrical cable adapted for use with portable welding machines, comprising in combination, a flexible cable body composed of loosely twisted metallic conducting strands providing for the circulation of a cooling fluid therethrough, a braid formed of small flexible strands of non-magnetic, non-corrosive metal of high tensile strength over said body, a copper ferrule placed over said braid and body at the end of the cable, said ferrule being swedged down compressively on the cable body at its outer end and being flared at its inner end, an electrical terminal placed over the swedged portion of said ferrule, and means for supplying cooling fluid into the uncompressed body of said cable.

8. A flexible, fluid-cooled electrical cable adapted for use with portable welding machines, comprising in combination, a flexible cable body composed of loosely twisted metallic conducting strands providing for the circulation of a cooling fluid therethrough, a braid formed of small flexible strands of non-magnetic, non-corrosive metal of high tensile strength over said body, a copper ferrule placed over said braid and body at the end of the cable, said ferrule being swedged down compressively on the cable body at its outer end and being flared at its inner end, an electrical terminal placed over the swedged portion of said ferrule, a resilient insulating hose on said cable which is clamped to the cable at each end, and means for supplying cooling fluid within the loose body of the cable in said hose.

9. A flexible, fluid-cooled electrical cable adapted for use with portable welding machines, comprising in combination, a cable body composed of loosely twisted ropes of small flexible conducting strands providing for circulation of cooling fluid throughout said cable body, a flexible open pressure resistant core in said body, and a braid formed of a plurality of ribbons of small strands of stainless steel over said body.

10. A flexible, fluid-cooled electrical cable adapted for use with portable welding machines, comprising in combination, a cable body composed of loosely twisted metallic conducting strands providing for the circulation of a cooling fluid therethrough, a flexible open pressure-resistant core in said body, a braid formed of small flexible strands of non-magnetic, non-corrosive metal of high tensile strength over said body, a copper ferrule placed over said braid and body at the end of the cable, said ferrule being swedged down compressively on the cable body at its outer end and being flared at its inner end, an electrical terminal placed over the swedged portion of said ferrule, a resilient insulating hose on said cable which is clamped to the cable at each end, and means for supplying cooling fluid to the loose body of the cable within said hose.

11. An electrical cable adapted for use with welding machines employing heavy currents, comprising in combination, a cable body including a plurality of loosely twisted flexible strands having good electrical conductivity and resistance to corrosion of a cooling fluid circulating in the loose body, and a sustaining jacket comprising strands of flexible material stronger than the interior conducting strands, said sustaining jacket also being resistant to corrosion by the cooling fluid.

12. An electrical cable adapted for use with welding machines employing heavy currents, comprising in combination, a cable body including a plurality of loosely twisted flexible strands having good electrical conductivity and resistance to corrosion of a cooling fluid circulating in the loose body, a sustaining jacket comprising strands of flexible material stronger than the interior conducting strands, said sustaining jacket also being resistant to corrosion by the cooling fluid, and a terminal at the ends of the cable firmly secured to said cable body and also to said strong jacket for taking tensile strains on the cable.

13. A cable as set forth in claim 12, further characterized by the fact that said terminal embraces a compressed end of the cable.

14. A cable as set forth in claim 12, further characterized by the fact that said terminal is swedged and soldered to a compressed end of the cable.

15. A cable as set forth in claim 12, further characterized by the fact that said terminal at its outer end is swedged and soldered to a compressed end of the cable and is flared at its inner end to embrace the loose body of the cable.

16. A cable as set forth in claim 12 which further comprises in combination, a central spiral open coil extending through the cable body from end to end, and a resilient fluid-retaining jacket enclosing the cable, said terminal at its outer end being swedged and soldered to a compressed end of the cable and being flared at its inner end to embrace the loose body of the cable, and said resilient jacket being secured over the flared end of the terminal.

EDWIN A. ROBERTSON.